Patented Oct. 19, 1948

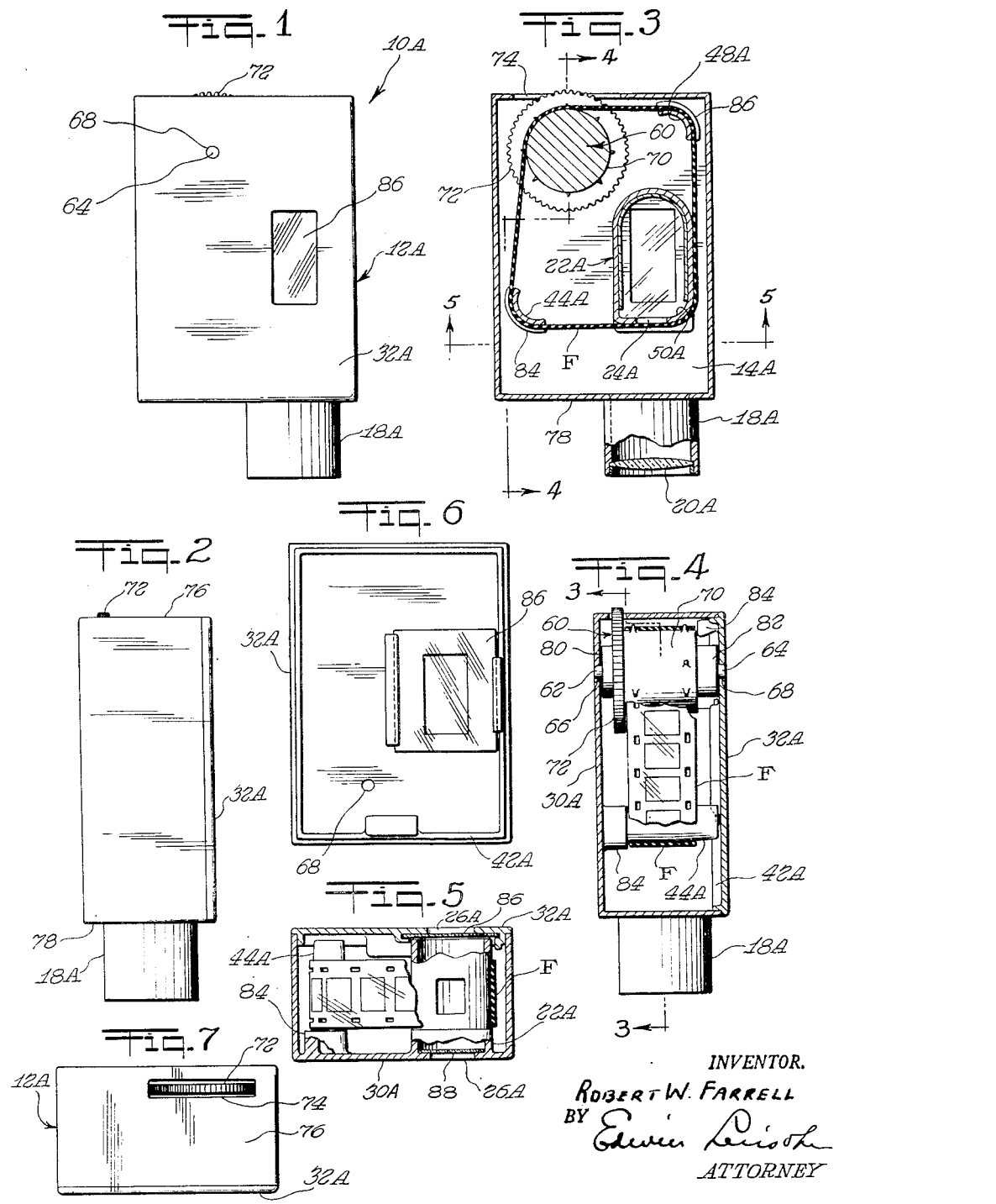

2,451,544

UNITED STATES PATENT OFFICE 2,451,544

FILM VIEWING DEVICE

Robert W. Farrell, New York, N. Y.

Application October 26, 1946, Serial No. 705,876

4 Claims. (Cl. 88—17)

This invention relates to film viewing devices of the type shown in my Patent No. 2,408,384.

One object of the present invention is the provision of a film viewing device of improved construction, especially in respect to the mounting of the film and in respect to the way in which the film may be moved by the user of the device in viewing the film.

The above and other objects, features and advantages of the invention will be fully understood from the following description, reference being had to the accompanying illustrative drawings.

In the drawings:

Fig. 1 is a plan view of a film viewing device embodying the present invention;

Fig. 2 is a side elevational view of the device;

Fig. 3 is a sectional view on the line 3—3 of Fig. 4;

Fig. 4 is a sectional view on the line 4—4 of Fig. 3;

Fig. 5 is a sectional view on the line 5—5 of Fig. 3;

Fig. 6 is an inner face view of the cover of the casing.

Fig. 7 is an end view.

Referring now to the drawings in detail, the film viewing device 10A embodying the present invention is preferably formed by molding the same from a suitable plastic but can be formed of any other suitable material or combinations of different materials. As here shown, said device is in the form of a casing 12A defining a chamber 14A within which an endless film F is mounted for movement in relation to a viewing opening provided in a tubular member 18A having a magnifying lens 20A mounted therein. A light compartment 22A is positioned within chamber 14 and is provided with a light outlet 24A across which the film travels and which registers with the viewing opening of member 18A. Light entrance openings 26A for light compartment 22A are provided, as here shown, in the opposite side walls 30A and 32A, respectively, of casing 12A.

Casing 12A is preferably formed in two parts. One of said parts comprises the side wall 30A and the peripheral wall integral therewith, and the other of said parts comprises the removable side wall or cover 32A. The part which comprises side wall 30A and peripheral wall may be molded or otherwise formed in one piece, and the tubular viewing member 18A is preferably formed integrally with the front portion 78 of said peripheral wall. The light compartment 22A is defined by a peripheral wall 40 which is preferably integral with side wall 30A, said peripheral wall extending widthwise from the inner surface of side wall 30A to the inner surface of the opposite side wall 32A. Peripheral wall 40 is imperforate except at the light outlet opening 24A which is provided therein. When a film F is mounted in chamber 14A, light outlet opening 24A is sealed by said film and since the light compartment is otherwise in light sealed relation with respect to chamber 14A, only the portion of the film which passes across said light outlet opening is illuminated. It will be understood that light inlet openings 26A communicate only with the interior of light compartment 22A and that chamber 14A is completely closed to the entrance of light except that which passes through light outlet opening 24A and through the film when the latter is mounted within the casing in chamber 14A. Side wall or cover 32A of casing 12 is provided with a continuous peripheral flange 42A which fits snugly within the peripheral wall of the casing in frictional engagement therewith.

The device is provided with means for mounting the endless film in chamber 14A for movement around the light compartment 22A and across the opening of tube 18A and opening 24A in registry therewith in the space between said openings. As here shown, said mounting means comprises a rotary member 60, hereinafter more specifically described, and the mounting members 44A and 48A and also a portion 50A of peripheral wall 40 of light compartment 22A, said members 44A and 48A and said peripheral wall portion 50A having arcuately curved surfaces which the film F slidably engages during the movement of said film. Members 44A and 48A, which are of the same construction, are preferably formed integrally with side wall 30A of the casing and extend from the inner surface of said side wall close to the inner surface of the opposite side wall 32A. It will be noted that the film guiding and mounting means are constructed and positioned in chamber 14A so that the film is spaced from the inner surface of the peripheral wall of the casing and from the inner surface of flange 42A of side wall 32A.

As will be readily understood the viewing device can be used without requiring a lamp in the light compartment 22A, since said light compartment is illuminated by light which enters said compartment through the light entrance opening 26A, and said light can be either daylight or artificial light of an illuminated room or of a lamp positioned externally of casing 12A in light transmitting relation with the interior of light compartment 22A. However, it is within the scope of the present invention to provide a lamp within the light compartment 22A. Preferably, the inner surface of peripheral wall of the light compartment or the portion thereof which confronts light outlet opening 24A is provided as illustrated with a white or other light colored light reflecting paper or other sheet material, or alternatively said peripheral wall can be formed of white or light colored material or its inner surface can be white or of other light reflecting color. Also, it will be understood that when a lamp is provided within compartment 22A, the device can be used to project the film through opening of tube 18 onto a viewing screen, suitable lenses being provided in lieu of or in addition to lens 20A if necessary. The above described viewing device is intended primarily for use with endless films of standard 16 mm. width, but can be made in any suitable size for use with films or other transparencies of any other suitable width.

Member 60 is mounted for rotation in casing 12A and for this purpose is provided with reduced end portions or trunnions 62 and 64 which are journalled for rotation in bearing openings 66 and 68 respectively in the side wall 30A and in the opposite side wall or casing cover 32A. Rotary member 60 is preferably formed in one piece of a suitable plastic and comprises a cylindrical portion 70 which engages the surface of film F for the full width thereof and which is provided with sprocket teeth which engage the film in the sprocket holes thereof for moving the film past the opening 24A of the light compartment 22A. Said member 60 also includes a circular part or knob 72 which projects through an opening 74 in the end wall 76 of the casing which is opposite the front wall 78 which carries the viewing tube 18A, thus providing access externally of the casing for manual operation of rotary member 60 for moving the film F in the use of the viewing device 10A.

Rotary member 60 has shoulders 80 and 82 adjacent the opposite ends thereof, said shoulders being formed by the reduced end portions 62 and 64. Said shoulders slidably engage the inner surfaces of walls 30A and 32A respectively of the casing, and it will be observed that said side walls by their engagement with said shoulders hold the rotary member 60 in position in the casing. Cover 32A is provided with a continuous peripheral flange 42A which fits snugly within the peripheral wall of the casing for removably securing said cover to the casing. Guide or mounting members 44A and 48A are provided with laterally projecting portions 84 and 86 respectively for positioning the film laterally of said guide members. It will be observed that cover 32A is provided with a transparent closure member 86, preferably formed of a plastic and that a similar transparent closure member 88 is provided in wall 30A for the light entrance openings of compartment 22A.

It will be observed that said rotary member 60 enables the device to be held in one hand, for viewing the film, while the rotary member is rotated by the user's finger of the same hand in which the device is held, thus making it unnecessary for the user to utilize both hands when using the device. Also it will be observed that member 60 together with guide members 44A, 48A and 50A provide improved means for mounting the film in position and for holding the latter in position while the film is moved past the opening 24A of the light compartment 22A and the viewing opening of tube 18A. Further it will be noted that rotary member 60 also constitutes a mounting member for the film as well as an operating member for moving the film.

While I have shown and described the preferred embodiment of my invention, it will be understood that various changes may be made therein without departing from the underlying idea of the invention within the scope of the appended claims.

Having thus described my invention, what I claim and desire to secure by Letters Patent is:

1. In a film viewing device, provided with film moving means, a chamber provided with a viewing opening, said chamber having a peripheral wall, in which said viewing opening is provided, spaced side walls, and a second peripheral wall in said chamber spaced laterally of said first mentioned peripheral wall, said second peripheral wall having an opening in registry with said viewing openings, means for mounting an endless film in the form of a single loop in said chamber widthwise between said spaced side walls for movement by said film moving means around said second peripheral wall in the space between said two peripheral walls and across said openings, said second peripheral wall defining a light compartment sealed from the interior of said chamber except at said opening which registers with said viewing opening, said mounting means including stationary parts which are slidably engaged by the film and including also a rotary member having a cylindrical portion engaging the surface of film and directing the latter for movement from one direction to a direction transversely of said one direction and provided with means releasably engageable with the film for moving the latter around said second peripheral wall.

2. In a film viewing device, provided with film moving means, a chamber provided with a viewing opening, said chamber having a peripheral wall, in which said viewing opening is provided, spaced side walls, and a second peripheral wall in said chamber spaced laterally of said first mentioned peripheral wall, said second peripheral wall having an opening in registry with said viewing openings, means for mounting an endless film in said chamber widthwise between said spaced side walls for movement by said film moving means around said second peripheral wall in the space between said two peripheral walls and across said openings, said second peripheral wall defining a light compartment sealed from the interior of said chamber except at said opening which registers with said viewing opening, said mounting means including stationary parts which are slidably engaged by the film and including also a rotary member having a cylindrical portion engaging the surface of film and directing the latter for movement from one direction to a direction transversely of said one direction and provided with means releasably engageable with the film for moving the latter around said second peripheral wall, said chamber having opposite walls spaced axially of said rotary member and provided with bearing openings in which said rotary member is journalled for rotation.

3. In a film viewing device, provided with film moving means, a chamber provided with a viewing opening, said chamber having a peripheral wall, in which said viewing opening is provided, spaced side walls, and a second peripheral wall in said chamber spaced laterally of said first mentioned peripheral wall, said second peripheral wall having an opening in registry with said viewing openings, means for mounting an endless film in the form of a single loop in said chamber widthwise between said spaced side walls for movement by said film moving means around said second peripheral wall in the space between said two peripheral walls and across said openings, said second peripheral wall defining a light compartment sealed from the interior of said chamber except at said opening which registers with said viewing opening, said mounting means including a rotary member having a cylindrical portion engaging the surface of film and provided with means releasably engageable with the film for moving the latter around said cylindrical portion and around said second peripheral wall, said cylindrical member having reduced opposite end portions providing shoulders adjacent said end portions, respectively, and said chamber having opposite walls which abut said shoulders, respectively, for holding said rotary member in position in said chamber and which are provided with bearing openings in which said reduced end portions are journalled for rotation.

4. In a film viewing device, provided with film moving means, a chamber provided with a viewing opening, said chamber having a peripheral wall, in which said viewing opening is provided, spaced side walls, and a second peripheral wall in said chamber spaced laterally of said first mentioned peripheral wall, said second peripheral wall having an opening in registry with said viewing openings, means for mounting an endless film in the form of a single loop in said chamber widthwise between said spaced side walls for movement by said film moving means around said second peripheral wall in the space between said two peripheral walls and across said openings, said second peripheral wall defining a light compartment sealed from the interior of said chamber except at said opening which registers with said viewing opening, said mounting means including a rotary member having a cylindrical portion engaging the surface of film and directing the latter for movement from one direction to a direction transversely of said one direction and provided with means releasably engageable with the film for moving the latter around said second peripheral wall, said cylindrical member having reduced opposite end portions providing shoulders adjacent said end portions, respectively, and said chamber having opposite walls which abut said shoulders, respectively, for holding said rotary member in position in said chamber and which are provided with bearing openings in which said reduced end portions are journalled for rotation, said peripheral wall of the chamber having a second opening and said rotary member having a part projecting through said second opening of the peripheral wall for engagement by the user of the device for rotating said rotary member.

ROBERT W. FARRELL.

REFERENCES CITED

The following references are of record in the file of this patent:

UNITED STATES PATENTS

| Number | Name | Date |
|---|---|---|
| 1,350,374 | Michalek | Aug. 24, 1920 |
| 1,957,378 | Zimmerman | May 1, 1934 |
| 2,408,384 | Farrell | Oct. 1, 1946 |
| 2,432,200 | Lasky | Dec. 9, 1947 |